United States Patent
Nishimura

(10) Patent No.: US 7,102,685 B2
(45) Date of Patent: Sep. 5, 2006

(54) DIGITAL CAMERA WITH CHANGEABLE OPERATION SEQUENCE

(75) Inventor: Tomoyuki Nishimura, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 597 days.

(21) Appl. No.: 10/146,916

(22) Filed: May 17, 2002

(65) Prior Publication Data

US 2002/0171755 A1 Nov. 21, 2002

(30) Foreign Application Priority Data

May 18, 2001 (JP) ............................. 2001-148737

(51) Int. Cl.
  *H04N 5/225* (2006.01)
  *H04N 5/222* (2006.01)
(52) U.S. Cl. .................. 348/372; 348/371; 348/333.13
(58) Field of Classification Search ................ 348/372, 348/207.99, 371, 333.13; 396/303, 277
  See application file for complete search history.

(56) References Cited

U.S. PATENT DOCUMENTS

| | | | | |
|---|---|---|---|---|
| 5,027,147 A | * | 6/1991 | Kaneda | 396/81 |
| 5,241,335 A | * | 8/1993 | McIntyre | 396/86 |
| 5,369,460 A | * | 11/1994 | Taniguchi et al. | 396/80 |
| 5,864,726 A | * | 1/1999 | Yamamoto | 396/429 |
| 6,031,999 A | * | 2/2000 | Ogawa | 396/303 |
| 6,233,016 B1 | * | 5/2001 | Anderson et al. | 348/372 |
| 6,493,828 B1 | * | 12/2002 | Yamaguchi et al. | 713/324 |
| 6,580,460 B1 | * | 6/2003 | Takahashi et al. | 348/372 |
| 6,628,337 B1 | * | 9/2003 | Yoshida | 348/372 |
| 6,850,270 B1 | * | 2/2005 | Suzuki | 348/207.2 |
| 6,876,393 B1 | * | 4/2005 | Yokonuma | 348/372 |

FOREIGN PATENT DOCUMENTS

| | | |
|---|---|---|
| JP | 2000-241860 | 9/2000 |
| JP | 2000-253303 | 9/2000 |
| JP | 2000-261975 | 9/2000 |

* cited by examiner

*Primary Examiner*—Tuan Ho
*Assistant Examiner*—Justin Misleh
(74) *Attorney, Agent, or Firm*—Sughrue Mion, PLLC

(57) ABSTRACT

A battery property judging circuit measures a voltage of battery before and while a zoom motor is operated respectively. A type of the battery is determined by a voltage change of the battery. A CPU selects either one of a normal operation sequence or a power-saving operation sequence in accordance with the type of battery upon carrying out an operation mode. In the normal operation sequence, whose operation mode is zooming or focusing, the zoom motor and an AF motor are simultaneously driven so as to perform zooming and focusing, whereas in the power-saving operation sequence, zooming first, then focusing is performed.

3 Claims, 5 Drawing Sheets

DIGITAL CAMERA WITH CHANGEABLE OPERATION SEQUENCE

BACKGROUND OF THE INVENTION

1. Field of the Invention

The present invention relates to a digital camera of which operation sequence is changed in accordance with a property of battery.

2. Description of the Prior Arts

A digital camera is provided with an imaging device (for example a CCD image sensor), an A/D converter, an image processing circuit, an image memory, a diaphragm mechanism, a shutter mechanism, and so forth. The imaging device converts an optical image to an image signal. The A/D converter converts the image signal to a digital image signal. The image processing circuit carries out gradation correction, color correction, contour enhancement, sharpness processing, image cropping, and so forth. And the digital camera has a zoom lens, an electronic viewfinder, and a flash device. This electric viewfinder is constituted of a liquid crystal display panel (LCD) of a transmission type and a lamp for lighting the LCD panel.

In the taking mode, the digital image signal outputted from the image processing circuit is sent to the LCD panel to display a moving image in taking operation. The moving image is a rough image made of thinned pixels. When the shutter button is depressed, a fine still image having large number of pixels is stored in a memory medium (a memory card, for instance). And when the display mode is selected, a still image is read from the memory medium to be displayed on the LCD panel.

A primary battery or a secondary battery is loaded into the digital camera, by which the above electric circuit, the flash device, the electric viewfinder and the like are driven. Particularly the electric viewfinder and the flash device have large power consumption. When the battery is consumed while using the digital camera, the digital camera stops operating in the middle of operation.

So as to prevent the digital camera from stopping its operation, various measures have been taken. For instance, the following methods are known: one for changing charging voltage of a flash device in accordance with a type of a battery (JPA No.2000-241860), and the other for judging whether to shift to the display mode or not in accordance with a type of a battery (JPA No.2000-261975). And it is also known the method for limiting the display mode or the flash taking in accordance with the measured voltage of a battery, and for changing a set time until the power is automatically turned off (JPA No.2000-253303).

However, all measures mentioned above limit selectable operation modes in accordance with a type of a battery or a remaining amount of a battery. It is not possible, for example, to select the display mode and the flash taking in case of small capacity of power supply. This may cause a user to find it hard to use the digital camera.

SUMMARY OF THE INVENTION

A main object of the present invention is to provide a digital camera that all operation modes are selectable regardless of a type or a remaining amount of battery.

Another object of the present invention is to provide a digital camera whose battery is made good use of.

In order to achieve the above and the other objects, one operation sequence corresponding to a property of battery is selected among plural kinds of operation sequences with different power consumption so as to carry out the selected operation mode by the specified operation sequence. The property of this battery represents capacity of power supply and is determined in accordance with a type of battery and/or a remaining amount of battery.

According to the preferred embodiments of the present invention, there are a power-saving operation sequence of small power consumption and a normal operation sequence of large power consumption. In case the battery is a type of large capacity of power supply or has a large remaining amount, the normal operation sequence is selected. In case the battery is a type of small capacity of power supply or has a small remaining amount, the power-saving operation sequence is selected.

In the power-saving operation sequence of the electric viewfinder, the electric viewfinder is temporarily turned OFF upon taking a still image by releasing a shutter, whereas, in the normal operation sequence, the electric viewfinder is kept ON upon taking a still image. Similarly, it is also suitable that the electric viewfinder is dimmed in the power-saving operation sequence, whereas it is lighted up in the normal operation sequence.

In the power-saving operation sequence, an image signal from the imaging device is amplified by a high gain upon flash taking and the flash amount to be emitted from the flash device is decreased in accordance with the high gain value. In the normal operation sequence, the image signal from the imaging device is amplified by a normal gain upon flash taking and the flash amount of the flash device is made a normal level.

In the power-saving operation sequence of a zoom lens, focusing is performed after zooming. In the normal operation sequence, zooming and focusing is performed simultaneously. As an alternative method, in the power-saving operation sequence, the zoom motor is rotated at a low speed, and in the normal operation sequence, the zoom motor is rotated at a high speed.

In the power-saving operation mode of a CPU, a frequency of a clock pulse is lowered, while in the normal operation sequence, it is heightened.

According to the digital camera of the present invention, the power-saving operation sequence or the normal operation sequence is selected in accordance with a property of battery, so that it is possible to carry out the operation mode selected by a user. Since the selectable operation mode is not limited in accordance with a property of the battery, the digital camera can be easily handled. Moreover, utilizing the battery can be realized in case of a battery with small power supply, as the power-saving operation sequence is performed.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
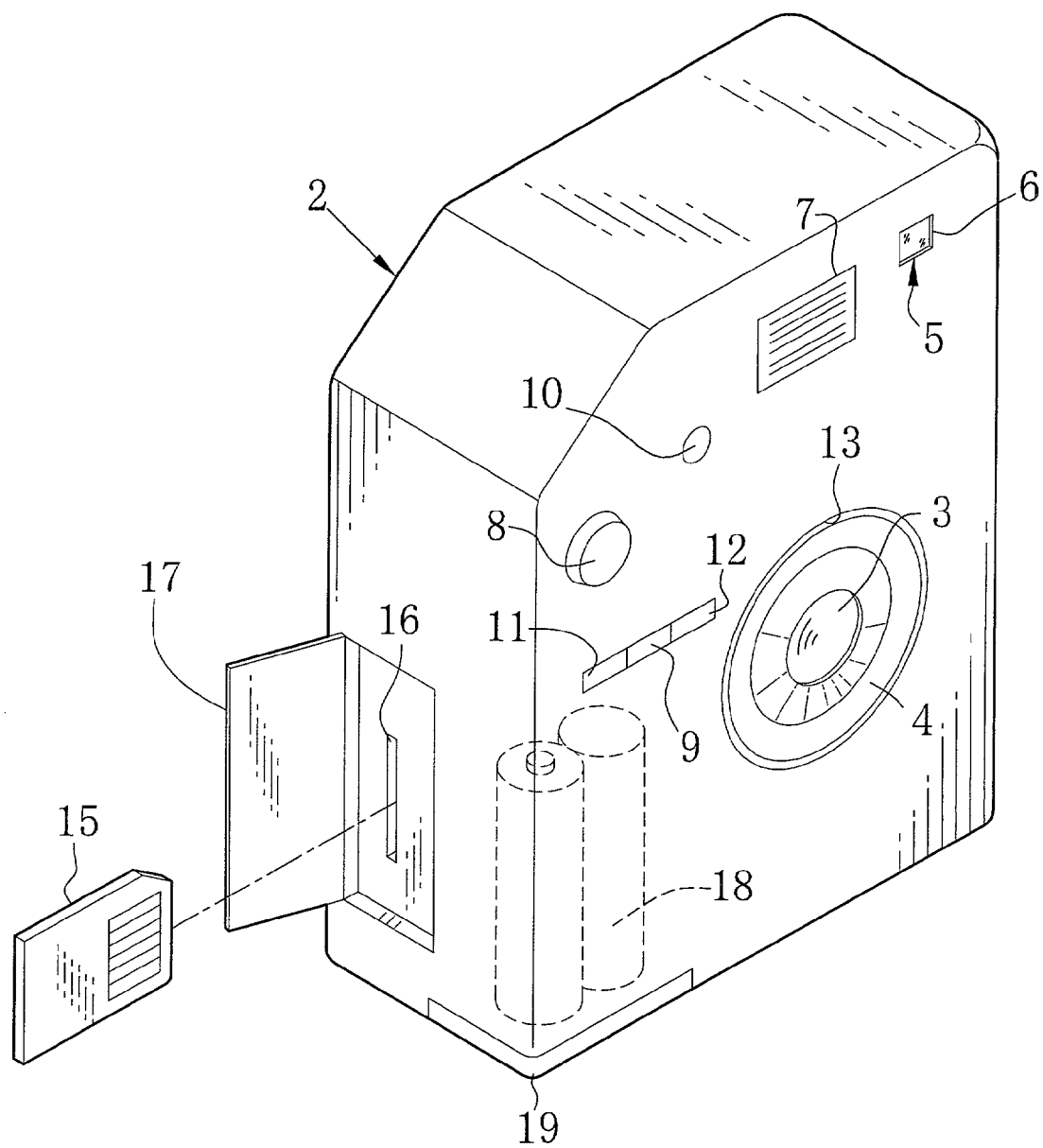
FIG. 1 is a front perspective view of a digital camera of the present invention.
Figure 2:
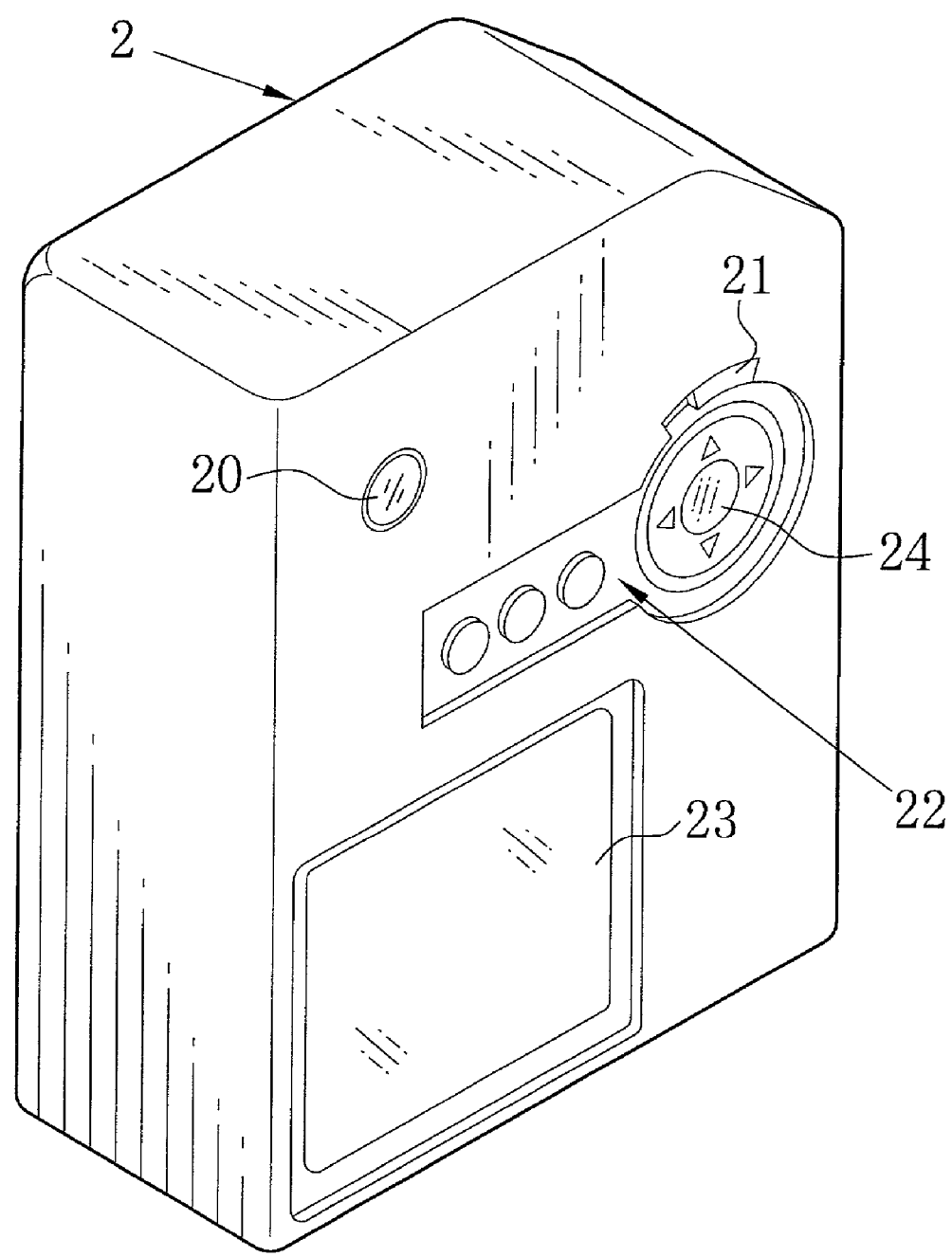
FIG. 2 is a rear perspective view of a digital camera shown in FIG. 1.

In FIGS. 1 and 2, the front of a digital camera 2 has a lens barrel 4 having a taking lens 3, an objective finder window 6 of an optical finder 5, a flash projector 7 for projecting flash light towards a subject, a release button 8, a self-timer emitter 9 which twinkles for informing the taking timing upon self-timer photography, a photometry window 10, a range finding projector window 11, and a range finding light-receiving window 12.

A memory card slot 16 is formed on the side of the digital camera 2. A memory card 15, into which a taken still image is stored, is set into the memory card slot 16. A memory card reader for reading and writing data to the memory card 15 is contained behind the memory card slot 16. The memory card slot 16 is covered by a protective cover 17, which is opened and closed so as to keep away from dust and so forth. A battery lid 19 for loading a battery 18 is provided on the bottom of the digital camera 2. A battery lid 19 is opened for loading or taking out the battery 18. It is possible for the digital camera 2 to use not only its exclusive use battery, but also alkali batteries on the market.

There are an eyepiece finder window 20 of the optical finder 5, a power switch 21 of a slide type, an operation section 22, and a liquid crystal display panel (LCD) 23 which performs as an electronic view finder and a monitor on the rear of the digital camera 2. The operation section 22 has plural operation buttons and a LCD 24 for displaying what is operated. By operating this operation section 22, it is possible to select any of "taking mode", "replay mode", "auto taking", "manual taking", "flash taking", "self-timer taking" and so forth. When the power switch 21 is turned off, the lens barrel 4 is contained inside of a lens barrel storage portion 13. When the power switch 21 is turned on, the lens barrel 4 is protruded from the lens barrel storage portion 13.

Figure 3:
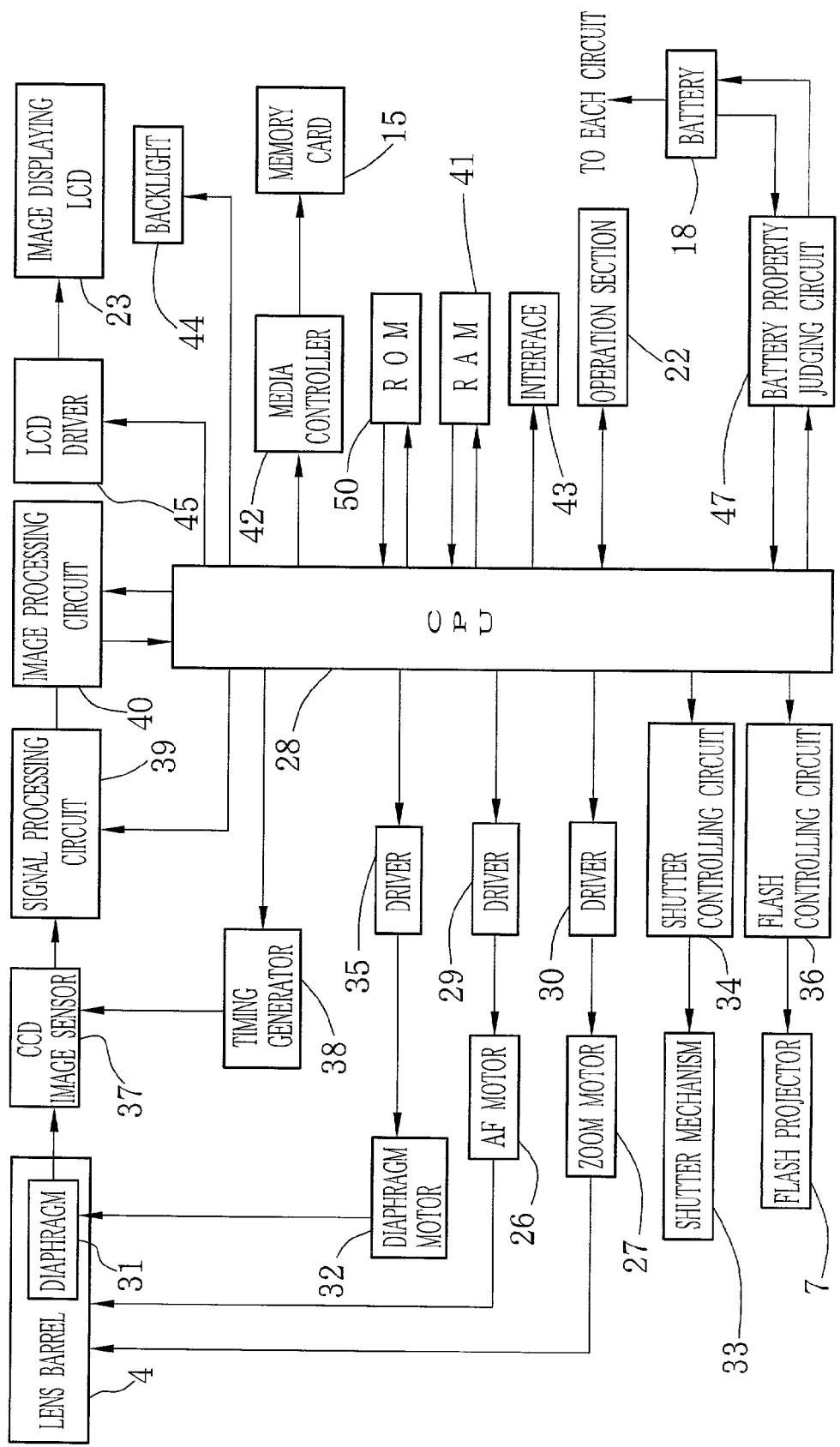
FIG. 3 is a block diagram illustrating an electric structure of a digital camera.

In FIG. 3, an AF motor 26 for adjusting a focus and a zoom motor 27 for changing a magnification of a lens are incorporated into the lens barrel 4. The AF motor 26 and the zoom motor 27 are controlled by a CPU 28 through drivers 29 and 30. In the "auto taking", the AF motor 26 and the zoom motor 27 are controlled on the basis of the measured value by the range finding device. A diaphragm mechanism 31 is provided inside of the lens barrel 4. A diaphragm is controlled by a diaphragm motor 32. A shutter mechanism 33 is located on the back of the lens barrel 4 and is driven by a shutter controlling circuit 34. It is to be noted that a numeral 35 is a driver for the diaphragm motor 32 and a numeral 36 is a flash controlling circuit.

A CCD image sensor 37 is disposed on the back of the shutter mechanism 33 so as to receive light of a subject transmitted the taking lens 3. A timing signal (clock signal) is inputted from a timing generator 38 to the CCD image sensor 37. Electrical charge storage period of the CCD image sensor 37 is determined by this timing signal. Each cell of the CCD image sensor 37 performs photoelectric conversion to incident light during the set electrical charge storage period. The accumulated electric charge in each cell is transmitted to a signal processing circuit 39 as an image signal. The signal processing circuit 39, including a correlated double sampling circuit (CDS), an amplifier (AMP), and an A/D converter, converts an image signal to a digital image data. The image data is thinned by the signal processing circuit 39 while taking a moving image, to be converted into a rough image.

An image processing circuit 40 carries out image correction such as white balance and γ-correction, color conversion, hyper tone processing for compressing gradation of ultra low frequency brightness component of an image, and hyper sharpness processing for enhancing sharpness while controlling granularity.

A rough image from the image processing circuit 40 is written in a RAM 41 while imaging. The image data is read from the RAM 41 and sent to a LCD driver 45, to display an image on the image display LCD 23. Since the writing and readout is performed periodically to the RAM 41 while imaging, the image in taking operation is displayed on the image display LCD 23 as a moving image.

On depressing the release button during the taking mode, a still image is taken at an electrical charge storage period in accordance with subject brightness. Since pixels are not thinned by the signal processing circuit 39, this still image is sent to the image processing circuit 39 as a fine image. The still image processed by the image processing circuit 39 is contemporarily written in the RAM 41. The image data in the RAM 41 is written in the memory card 15 through a media controller 42. According to the replay mode, of plural still images written in the memory card 15, the designated one is read out and converted to a rough image so as to be displayed on the image display LCD 23.

The image data is not only stored in the memory card 15, but also outputted to the exterior equipment by an interface 43. And the moving image can be outputted outside through the interface 43 while taking a moving image. It is to be noted that a numeral 44 is a backlight for lighting the image display LCD 23 from rearward.

A battery property judging circuit 47 determines the property of the battery 18 loaded in the digital camera 2. According to the embodiment, the battery property judging circuit 47 requires the difference between a voltage of the battery 18 before performing an operation mode and while operating an operation mode. In reference to the memory into which the relation between the change of voltage and the type of battery is stored, a type of the battery 18 is determined. The judging result is stored in the RAM 41. The CPU 28 selects either one of the normal operation sequence of large power consumption or the power-saving sequence of small power consumption in accordance with a type of battery. Although these operation sequences perform the same operation mode, they perform the operation sequence with different power consumption.

The battery property judging circuit 47 determines a type of battery from the property of the battery 18. The measured voltage and the remaining amount of battery are different in accordance with a type of battery. Therefore, the remaining amount of the battery can be examined by the battery property judging circuit 47. In any case, capacity of power supply in the battery 18 is estimated so as to set the corresponding operation sequence.

A controlling program for driving the digital camera 2 is stored in a ROM 50. The controlling program includes a program of normal operation sequence which drives each circuit in a predetermined manner, and a program of power-saving operation sequence which performs different operation sequence with low power in comparison with the normal sequence. Based on the decision by the battery property judging circuit 47, the CPU 28 selects the operation sequence. And the digital camera 2 is driven by the selected operation sequence.

Figure 4:
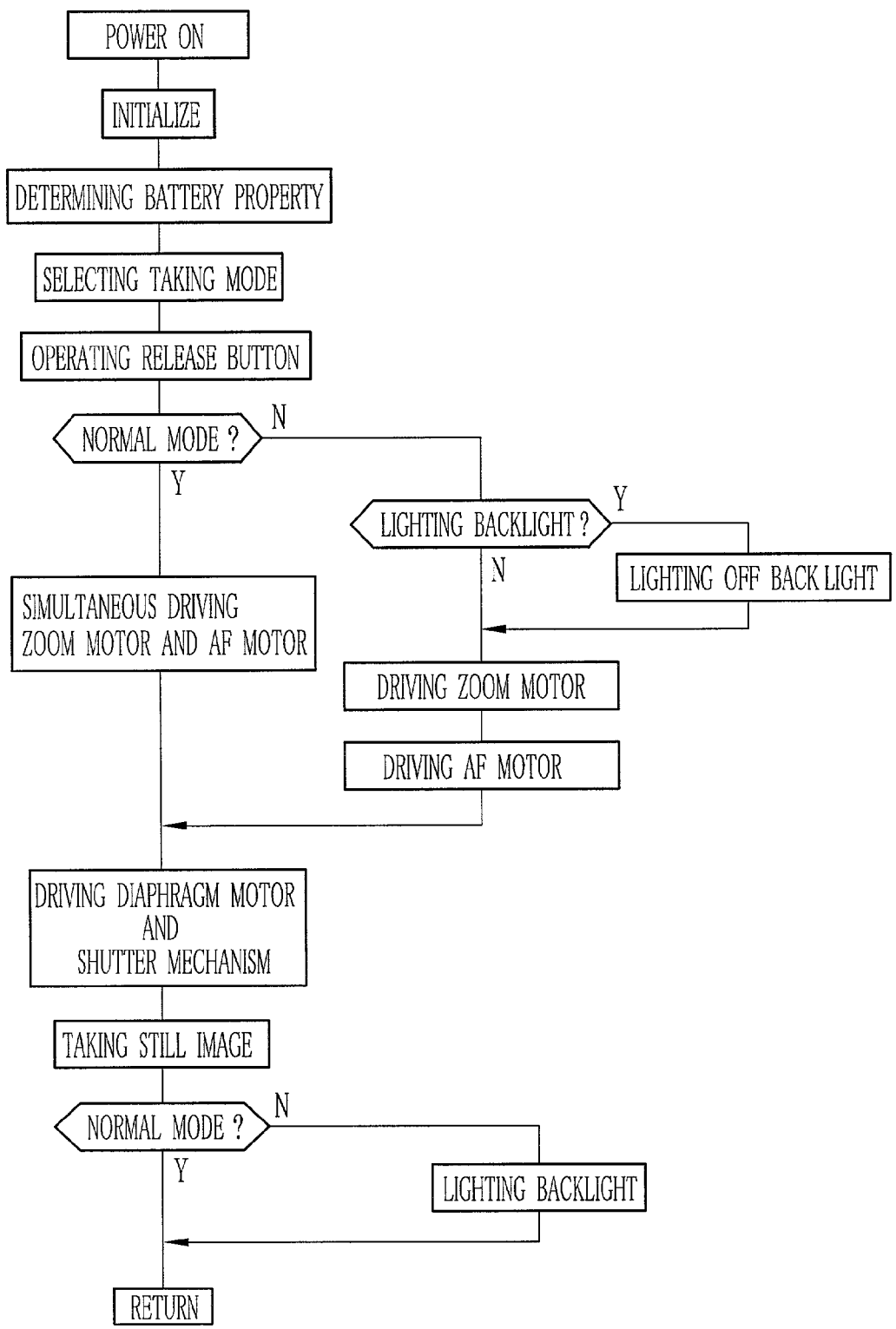
FIG. 4 is a flow chart showing taking process.

The operation of the above embodiment will be described in reference to FIG. 4. When the power switch 21 is turned on, the digital camera is initialized. After initializing, the AF motor 26 is driven. The battery property judging circuit 47 determines a type of the battery 18 from a voltage change of the battery 18 before and while the AF motor 26 is driven. Based on the result, the CPU 28 selects either one of the normal operation sequence or the power-saving operation sequence. It is also suitable to determine the type of the battery 18 from a voltage change of the battery 18 upon driving the zoom motor 27 or the image display LCD 23.

If the battery 18 is decided as a type of high power supply, the normal operation sequence is selected. Operating the mode switch to select the taking mode, the electric charge stored in each cell of the CCD image sensor 37 is converted to the image data by the signal processing circuit 39. Then the signal processing to the image data is performed by the image processing circuit 40, to be an image data of a rough image. The image data is temporarily stored in the RAM 41. When the image display LCD 23 is not set OFF forcibly, the image data in the RAM 41 is transmitted to the image display LCD 23 through the LCD driver 45. A moving image is displayed on the image display LCD 23. Since the normal operation sequence is selected in the image display LCD 23, the backlight 44 has high brightness. Accordingly, the bright moving image is displayed on the image display LCD 23. By observing this image display LCD 23, framing for taking a still image and so forth are performed.

Figure 5:
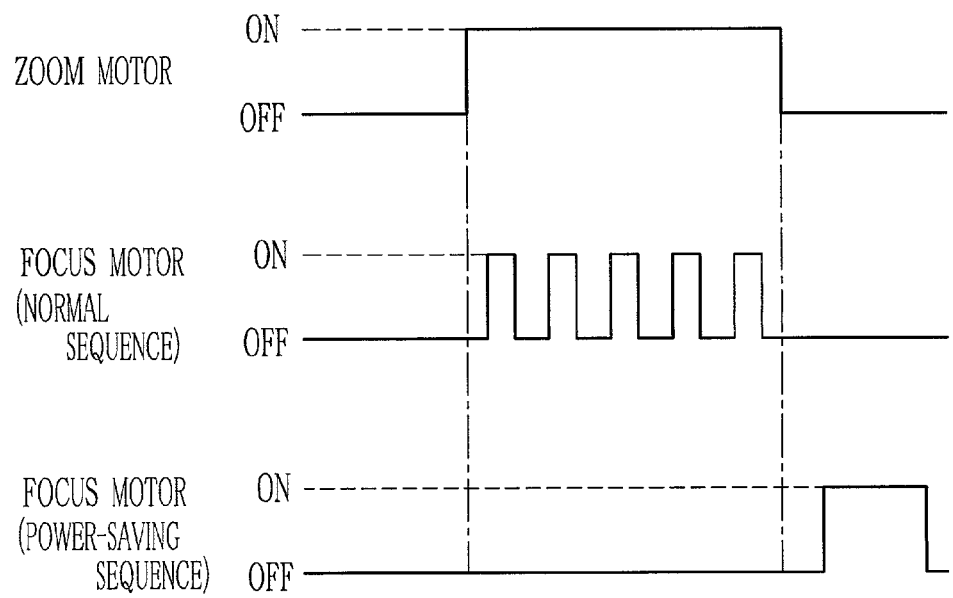
FIG. 5 is a timing chart showing operation of a zoom motor and an AF motor.

In case the "auto-taking" is set, the release button 8 is half depressed so as to measure a subject distance and the subject brightness. Based on the result, as shown in FIG. 5, the AF motor 26 and the zoom motor 27 are driven simultaneously to set a magnification of the zoom and adjust a focus suitable for the subject. When the release button 8 is fully depressed, the diaphragm motor 32 rotates to drive the diaphragm mechanism 31 at a suitable stop value based on the photometry value. Then the shutter mechanism 33 shields the front of the CCD image sensor 37. Then, the shutter mechanism 33 exposes the CCD image sensor 37. When the electric charge storage period passes from the commencement of the exposure, the readout of the signal is started in the CCD image sensor 37.

The electric charge stored in each cell of the CCD image sensor 37 is sent to the signal processing circuit 39 as an image signal. The image data of fine still image is outputted from the signal processing circuit 39 and temporarily stored in the RAM 41. Then, the still image is written in the memory card 15 through the media controller 42.

In case the "manual taking" is set, each button of the operation section 22 in the rear of the digital camera 2 is depressed so as to adjust a desirable diaphragm value, zoom magnification, and focus. The taken still image can be written in the memory card 15 by depressing the release button 8. As the normal operation sequence is selected at this time, for instance, flash taking of a predetermined flash amount can be performed.

If the battery 18 is determined as a type of low power supply, the power-saving operation sequence is selected. In the "auto-taking", the AF motor 26 and the zoom motor 27 are driven at a voltage value lower than the drive voltage in the normal operation sequence. For instance, on changing a magnification of zoom, as shown in FIG. 5, the zoom motor is driven to change the magnification of zoom, and then the AF motor is driven to adjust the focus.

Figure 6:
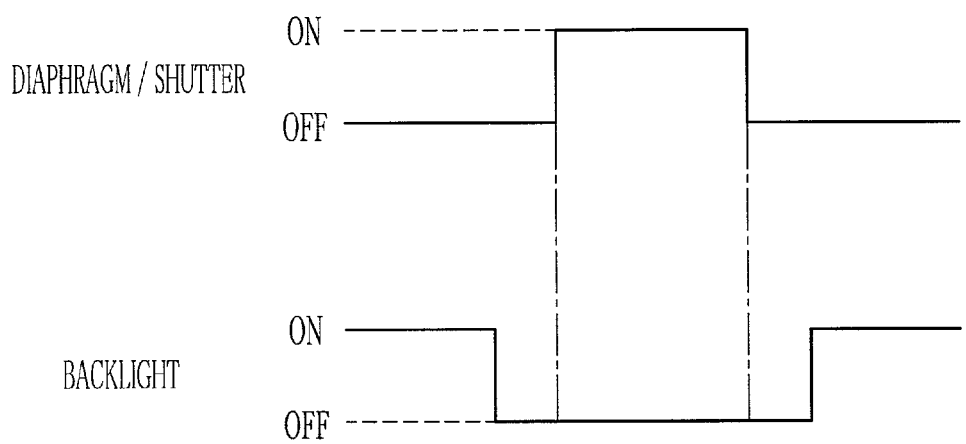
FIG. 6 is a timing chart illustrating operation of a diaphragm, a shutter and a backlight.

As shown in FIG. 6, the back light 44 of the image display LCD 23 is lighted off after operating the release button 8, and is relighted after taking. In case of flash taking, the flash projector 7 is controlled to reduce the flash amount in comparison with the normal operation sequence. In this case, the signal processing circuit 39 is set to a high value of an amplitude gain. The decrease amount of the flash amount is compensated by the signal amplitude. In the power-saving operation sequence, when the release button is not depressed or the replay mode is not set within a predetermined period, the image display LCD 23 is automatically turned off. In cooperation with this OFF operation, the power supply to the CCD image sensor 37 is also stopped. Consequently, consumption of power is kept low, so as to realize effective use of power.

Furthermore, the power-saving operation sequence is selected, the image display LCD 23 may be turned off automatically. In this case, the optical finder 5 is used for framing. In the normal operation sequence, the flash device is always charged by a low current so as to be activated at all times. In the power-saving operation sequence, charging the flash device by a low current may be stopped while the image display LCD 23 is ON. In this case, the flash device is charged when the digital camera 2 is in a stand-by condition. Besides that, a voltage of the capacitor is measured at all times. When the measured value is lowered less than a standard value, the image display LCD 23 is temporarily stopped to drive in preference to charge the capacitor.

According to the power-saving operation sequence of the present embodiment, a voltage value of the motor is lowered. Instead, lowering a clock pulse of the CPU 28 is also suitable in order to reduce consumption power of the battery 18. In this case, a clock generator constituted of a clock generating circuit and a frequency dividing circuit is provided so as to change the clock pulse in accordance with the judging result by the battery property judging circuit 47. Although this makes the operation of the digital camera slow, the power consumption can be controlled. And it is also preferable to provide an operation sequence having middle capacity of power supply so as to select any one of the three operation sequences.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera being driven by a battery comprising:
   a judging circuit for determining a property of said battery;
   a memory having stored plural operation sequences for activating said digital camera, each operation sequence performing different power consumption of said battery and causing said digital camera to perform different operation;
   a selector for selecting one of said plural operation sequences in accordance with said property of battery decided by said judging circuit, for activating said digital camera based on said selected operation sequence;
   an imaging device for performing photoelectric conversion of incident light so as to output an original image signal;
   an image processing circuit for performing image processing to said image signal;

a memory for storing a processed image signal that said image processing circuit processes said original image signal outputted from said imaging device upon taking a still image;

a CPU for controlling said imaging device, said image processing circuit, and said memory; and a flash device for flash taking, said flash taking projecting flash light from said flash device to a subject so as to take said still image, wherein said plural operation sequences are a power-saving operation sequence and a normal operation sequence, wherein said power-saving operation sequence increases an output signal from said imaging device at a high gain upon flash taking, and decreases said flash amount of said flash device in accordance with said high gain, and wherein said normal operation sequence increases said output signal from said imaging device at a normal gain upon flash taking, and said flash amount is set to a standard level.

2. A digital camera being driven by a battery comprising:

an imaging circuit that captures an image of a subject and outputs an image signal;

an image processing circuit that performs image processing on said image signal;

a judging circuit for determining a property of said battery;

a memory storing a plurality of operating sequences for said digital camera, each operating sequence performing a different operation based on a power consumption of said battery;

a selector for selecting one of said plurality of operational sequences in accordance with said property of said battery; and a flash device, said flash device projecting light when capturing said image, wherein said plurality of operational sequences comprise a power-saving operation sequence and a normal operation sequence, wherein said power-saving operation sequence increases said output signal from said imaging device at a high gain upon capturing said image using said flash device, and sets an amount of light projected from said flash device at a decreased level in accordance with said high gain, and wherein said normal operation sequence increases said output signal from said imaging device at a normal gain, which is less than the high gain, upon capturing said image using the flash device, and sets said amount of light projected from the flash device to a standard level, which is higher than the decreased level.

3. A digital camera being driven by a battery comprising:

a judging circuit for determining a property of said battery;

a memory having stored plural operation sequences for activating said digital camera, each operation sequence performing different power consumption of said battery and causing said digital camera to perform different operation;

a selector for selecting one of said plural operation sequences in accordance with said property of battery decided by said judging circuit, for activating said digital camera based on said selected operation sequence;

an imaging device for performing photoelectric conversion of incident light so as to output an original image signal;

an image processing circuit for performing image processing to said image signal;

a memory for storing a processed image signal that said image processing circuit processes said original image signal outputted from said imaging device upon taking a still image;

a CPU for controlling said imaging device, said image processing circuit, and said memory;

an electric viewfinder, said electric viewfinder having a liquid crystal display panel and a light source for illuminating said liquid crystal display panel; and a flash device, wherein said plural operation sequences are a power-saving operation sequence and a normal operation sequence, wherein said power-saving operation sequence turns off said light source upon initiation of taking said still image, whereas said normal operation sequence keeps said light source on upon initiation of taking said still image, wherein said light source is turned on after completion of taking said still image in said power-saving operation sequence, wherein, in said power-saving operation sequence, a charging current for said flash device is turned off when said light source is turned on, wherein, in said normal operation sequence, said charging current and said light source are both turned on, and wherein, in said power-saving operation sequence, said charging current is turned on and said light source is turned off when a charge voltage of said flash device is below a predetermined limit.

* * * * *